US010888741B2

(12) United States Patent
Toupin et al.

(10) Patent No.: US 10,888,741 B2
(45) Date of Patent: *Jan. 12, 2021

(54) SHORT GAME ANALYSIS SYSTEM

(71) Applicant: Acushnet Company, Fairhaven, MA (US)

(72) Inventors: Michael J. Toupin, Fall River, MA (US); Paul A. Furze, Tiverton, RI (US); Richard Daprato, Acushnet, MA (US); Glenn Grenier, North Dartmouth, MA (US); Anthony J. Couto, Fairhaven, MA (US); William Souza, Fall River, MA (US)

(73) Assignee: Acushnet Company, Fairhaven, MA (US)

( * ) Notice: Subject to any disclaimer, the term of this patent is extended or adjusted under 35 U.S.C. 154(b) by 190 days.

This patent is subject to a terminal disclaimer.

(21) Appl. No.: 16/107,114

(22) Filed: Aug. 21, 2018

(65) Prior Publication Data

US 2018/0361205 A1     Dec. 20, 2018

Related U.S. Application Data

(63) Continuation of application No. 14/816,116, filed on Aug. 3, 2015, now abandoned, which is a continuation-in-part of application No. 14/557,688, filed on Dec. 2, 2014, now Pat. No. 10,183,200.

(51) Int. Cl.
*A63B 47/00* (2006.01)
*G01L 1/00* (2006.01)

(52) U.S. Cl.
CPC .............. *A63B 47/008* (2013.01); *G01L 1/00* (2013.01)

(58) Field of Classification Search
CPC ....... A63B 47/008; A63B 57/00; A63B 60/42; A63B 60/46
USPC ........... 73/11.01, 12.01–12.08, 865.3, 865.9; 434/252; 473/131, 282
See application file for complete search history.

(56) References Cited

U.S. PATENT DOCUMENTS

| | | | |
|---|---|---|---|
| 3,373,612 A | 3/1968 | Thompson et al. | |
| 3,444,729 A | 5/1969 | Shobert | |
| 3,855,842 A | 12/1974 | Imabori et al. | |
| 4,062,222 A | 12/1977 | Solheim | |
| 4,996,867 A | 3/1991 | Miyamae | |
| 5,763,761 A | 6/1998 | Parente et al. | |
| 10,183,200 B2 * | 1/2019 | Furze | A63B 69/40 |
| 2005/0272516 A1 | 12/2005 | Gobush | |
| 2007/0293338 A1 * | 12/2007 | McFarlin | A63B 69/3623 473/278 |
| 2011/0067507 A1 | 3/2011 | Miyamae | |

* cited by examiner

*Primary Examiner* — Robert R Raevis

(57) ABSTRACT

The present invention generally relates to lightweight, portable robot for analyzing golf balls for short game performance attributes. The preferred robot is specifically designed to be lightweight and portable and to be able to hit a golf ball off of the ground or a mat that simulates the ground such that realistic short game performance of clubs and balls can be evaluated.

10 Claims, 7 Drawing Sheets

US 10,888,741 B2

SHORT GAME ANALYSIS SYSTEM

RELATED APPLICATIONS

The present application is a continuation of co-pending U.S. application Ser. No. 14/816,116, filed on Aug. 3, 2015, which is a continuation-in-part of co-pending U.S. application Ser. No. 14/557,688, filed on Dec. 2, 2014, both of which are hereby incorporated by reference in their entirety.

BACKGROUND OF THE INVENTION

Field of the Invention

The present invention relates generally a short game analysis system comprised of a portable hitting robot, a hitting mat and an analysis launch monitor.

Brief Review of the Related Art

The golf game is comprised of many facets: driving, fairway metal shots, iron shots and putting. However, one of the most important facets to scoring well is the short game, those wedge shots that are about 125 yards and shorter. The short game also includes very short shots from bunkers, rough, hard pan lies and soft fairways. The short game, thus, comprises many different types of shots from many different conditions and testing products to confirm that they enable a player to have the best opportunities for a good short game is very difficult.

In order to test golf products, many robots and launch monitors have been designed. Hitting robots date back to at least U.S. Pat. No. 3,373,612, which issued in 1968. This GolfCraft robot was used by Acushnet Company for many years to demonstrate the improvements and superior quality in the Acushnet golf balls over the competition. The robot was relatively simple in that it had a reverse motor that would move the club arm in correspondence to the golfer's backswing and then automatically release the arm at the end of the back swing. Potential energy storing means, a spring, was energized through the backswing and then would apply a driving force to the club arm to drive the club through the foreswing. The robot further allowed the club to be manually cocked prior to the backswing and then released so that the swing could mimic the wrist action of a golfer.

Referring to FIG. 1, a prior art robot 10 is substantially similar to that patented in U.S. Pat. No. 5,763,761, but it is placed on a movable base 12. The robot 10 has base 12, a plurality of wheels 14, a servomotor 16, a swing arm 18 and swing wrist 20. The golf club 22 is coupled to the swing wrist 20. The swing arm 18 and the swing wrist 20 are powered by the servomotor 16 through a gearbox such that the entire extent of the swing can be controlled by a specified angular position and the torque of the servomotor can be increased by a ratio of about 8-1. The swing arm 18 and the servomotor 16 are coupled to the base 12 by a plurality of swivel plates 24 and a plurality of mounting plates 26. The mounting plates 26 can be rotated to adjust the robot around a plane parallel to the object to be struck and the swivel plates 24 can be adjusted to adjust the lie angle of the golf club. The robot, like previous robots, is designed to swing a club so that it hits a golf ball off of a tee. Due to the gearbox, any impact force felt from the club has an extremely high reflective inertia force on the motor. For example with a torque ratio of 8-1, the reflective inertia torque from the golf club on the motor would be 64-1. Thus, golf club impacts can severely damage the electric motor. Overall, the robot, including the frame, swivel plates, mounting plates, swing arm and swing wrist, is constructed primarily of structural steel.

SUMMARY OF THE INVENTION

The present invention generally relates to lightweight, portable robot for analyzing golf balls for short game performance attributes. The preferred robot is specifically designed to be lightweight and portable and to be able to hit a golf ball off of the ground or a mat that simulates the ground such that realistic short game performance can be evaluated.

The portable golf hitting robot according to the present invention is comprised of a lightweight frame, a drive shaft coupled to the frame, a drive unit coupled to a first end of the drive shaft and a golf club gripping member coupled to a distal end of the drive shaft. The golf club is attached to the golf club gripping member and the drive unit provides the power to swing the club. The robot further comprises a one-way clutch juxtaposed between the drive unit and the golf club gripping member such that the club can freely rotate after the drive unit has swung the club through an impact location.

In a preferred embodiment, the golf gripping member forms a lie adjusting plate such that the lie angle of a golf club can be adjusted. The lie adjusting plate preferably includes an arcuate shaped lie adjustment groove that allows the plate to be rotated about an axis that is perpendicular to the drive shaft axis such that the lie angle of the golf club can be adjusted. Preferably, the drive shaft axis extends through or approximate to the golf club grip and the golf club is rotated in a pendulum manner about the drive shaft axis.

The preferred drive unit is a pneumatic rotary actuator and the robot further includes an air reservoir. The pneumatic rotary actuator preferably has sufficient torque to rotate the club head using less than a 4-1 torque ratio and preferably less than 2-1. Most preferably, the pneumatic rotary actuator is coupled to the golf club gripping member without any gear members such that the torque ratio from the actuator to the golf club gripping member is 1-1. This minimizes the reflective inertia from the club impacting a ground element. The robot further comprises pneumatic controls for adjusting the amount of torque applied to the golf club by the drive unit. The robot can further include a disc brake coupled to the drive shaft and brake calipers for stopping the rotation of the golf club. Preferably, a cam is coupled to the drive unit for actuating the brake calipers, which are preferably operated by a pneumatic actuation.

The frame is structurally small and lightweight. Preferably, the frame includes a plurality of arms, each of the arms having a pivot coupling at a first end to pivotally attach to the main body member. The arms also include ground abutting members at the distal ends. The ground abutting members can be pads, spikes or wheels, for example. The robot frame is preferably comprised of aluminum such that the entire robot weighs less than about 250 lbs, and more preferably, less than 150 lbs. More preferably, the robot weighs less than about 100 lbs.

The present invention is also directed to a portable golf hitting robot system, comprising a robot and a ground simulating element. The robot preferably includes a frame, a drive shaft coupled to the frame, a drive unit coupled to a first end of the drive shaft for supplying power thereto and a golf club gripping member coupled to a distal end of the drive shaft. The robot further comprises a one-way clutch juxtaposed between the drive unit and the golf club gripping member. The ground simulating element is a hitting mat that is comprised of a turf layer, a foam layer coupled to a bottom surface of the turf layer, a first structural layer coupled to a bottom surface of the foam layer, a base, and a plurality of springs juxtaposed the base and the first structural layer. The mat is designed to flex such that when a golf ball is struck off of the mat, the forces from the mat on the ball simulate the forces from the ground.

The present invention also contemplates a portable golf hitting robot system for swinging a golf club that comprises a frame, a drive shaft coupled to the frame, a pneumatic rotary actuator coupled to a first end of the drive shaft for supplying power thereto and a golf club gripping member coupled to a distal end of the drive shaft for coupling the golf club to the robot. The torque ratio from the pneumatic rotary actuator to the golf club gripping member is preferably less than 2-1, and more preferably 1-1. Thus, the golf club can be rotated in a pendulum manner directly about the drive shaft axis which extends proximate a grip portion of the golf club and impact a ground element and the reflective inertia from the impact will be minimized.

The present invention is also directed to a portable golf hitting robot and a method of using the robot. In order to simulate short game conditions, a golf ball is placed on the ground or on a ground simulating mat and struck with a golf club having 48 degrees of loft or more. Preferably the golf club is not attached to the robot through a swing arm and/or swing wrist, but rather is coupled to a club gripping member that is rotated about the axis of a drive shaft. Thus, the robot is comprised of a frame, a drive shaft coupled to the frame, a drive unit coupled to a first end of the drive shaft for supplying power thereto and a golf club gripping member coupled to a distal end of the drive shaft such that the torque ratio is 1-1. The club is thus rotated in a pendulum manner about the drive shaft axis which extends proximate the golf club grip. The robot can further include a one-way clutch juxtaposed between the drive unit and the golf club gripping member and a disc brake for stopping the rotation of the golf club. Preferably, the ground element is a hitting mat that simulates the forces on the golf ball when struck and includes a force measuring device to measure the contact force between the club and the mat.

BRIEF DESCRIPTION OF THE DRAWINGS

The novel features that are characteristic of the present invention are set forth in the appended claims. However, the preferred embodiments of the invention, together with further objects and attendant advantages, are best understood by reference to the following detailed description in connection with the accompanying drawings in which:

DETAILED DESCRIPTION OF THE INVENTION

Using golf ball hitting robots to evaluate golf balls and golf clubs is not new. Robots are particularly useful in that they can apply a very repeatable swing so that different golf balls or clubs can be compared. Launch monitors such as that disclosed in US Publication No. 2005/0272516 can be used to detect variations associated with club, ball and robot performance. Hitting robots have heretofore been designed to hit drivers and other clubs. However, their primary use is to evaluate club and ball performance for longer shots. Thus, the robots include a hitting arm such that the golf swing is imitated as much as possible. The robots are not used for short game performance evaluation. One reason is that the short game, hitting wedges of 48 degrees or more, generally involves hitting down on the ball and pinching the ball between the club and the ground.

The present invention generally relates to lightweight, portable robot for analyzing golf balls for short game performance attributes. The preferred robot is specifically designed to be lightweight and portable and to be able to hit a golf ball off of the ground or a mat that simulates the ground such that realistic short game performance can be evaluated.

Figure 1:
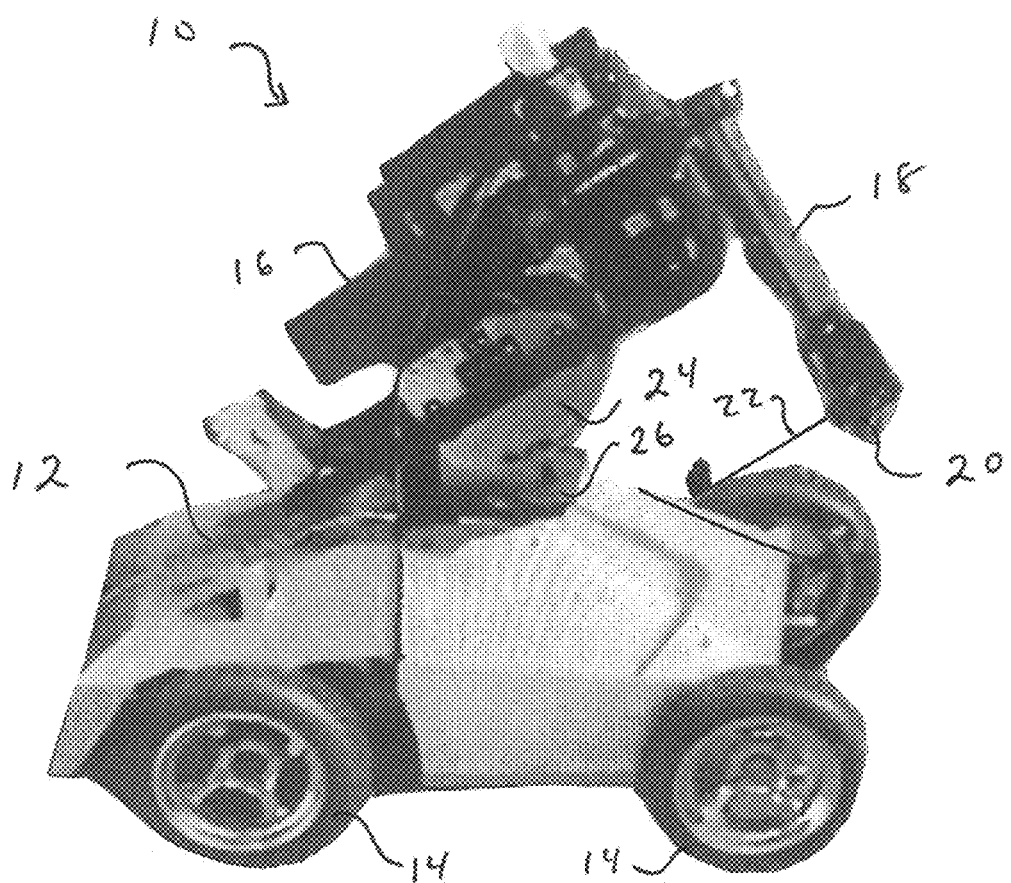
FIG. 1 is a prior art robot.
Figure 2:
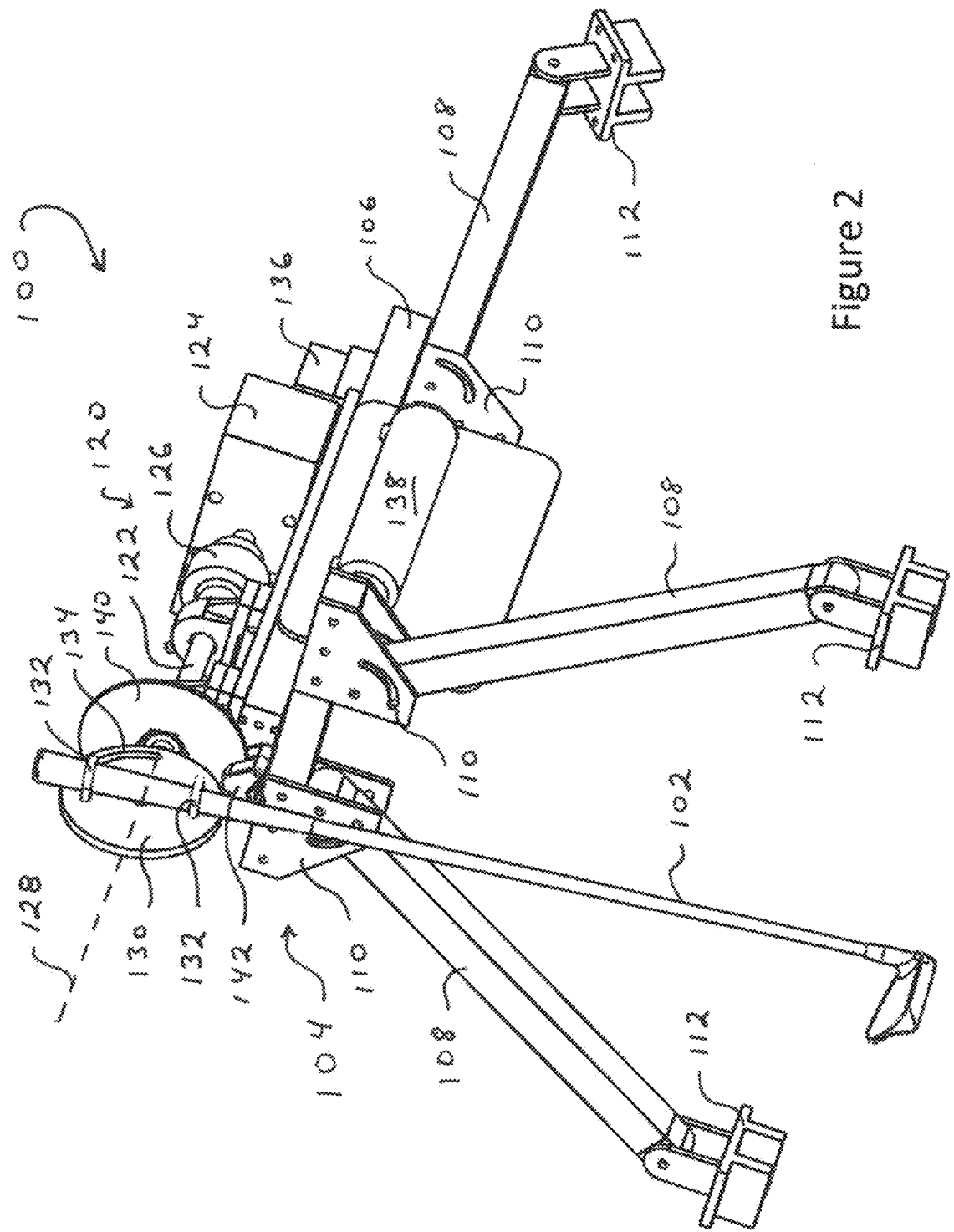
FIG. 2 is a front, right side perspective view of a robot according to the present invention.
Figure 3:
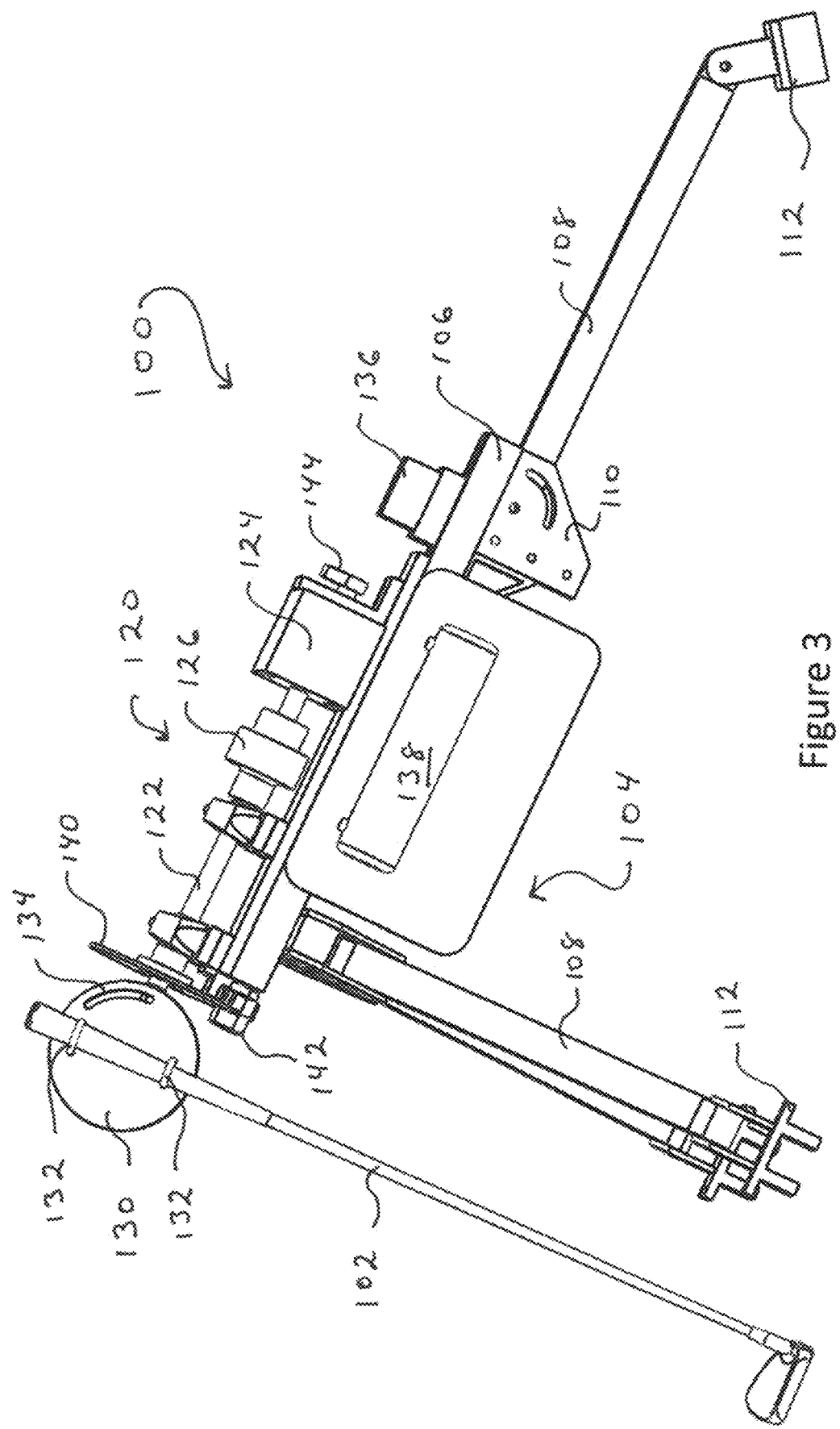
FIG. 3 is a side view of a robot according to the present invention.
Figure 4:
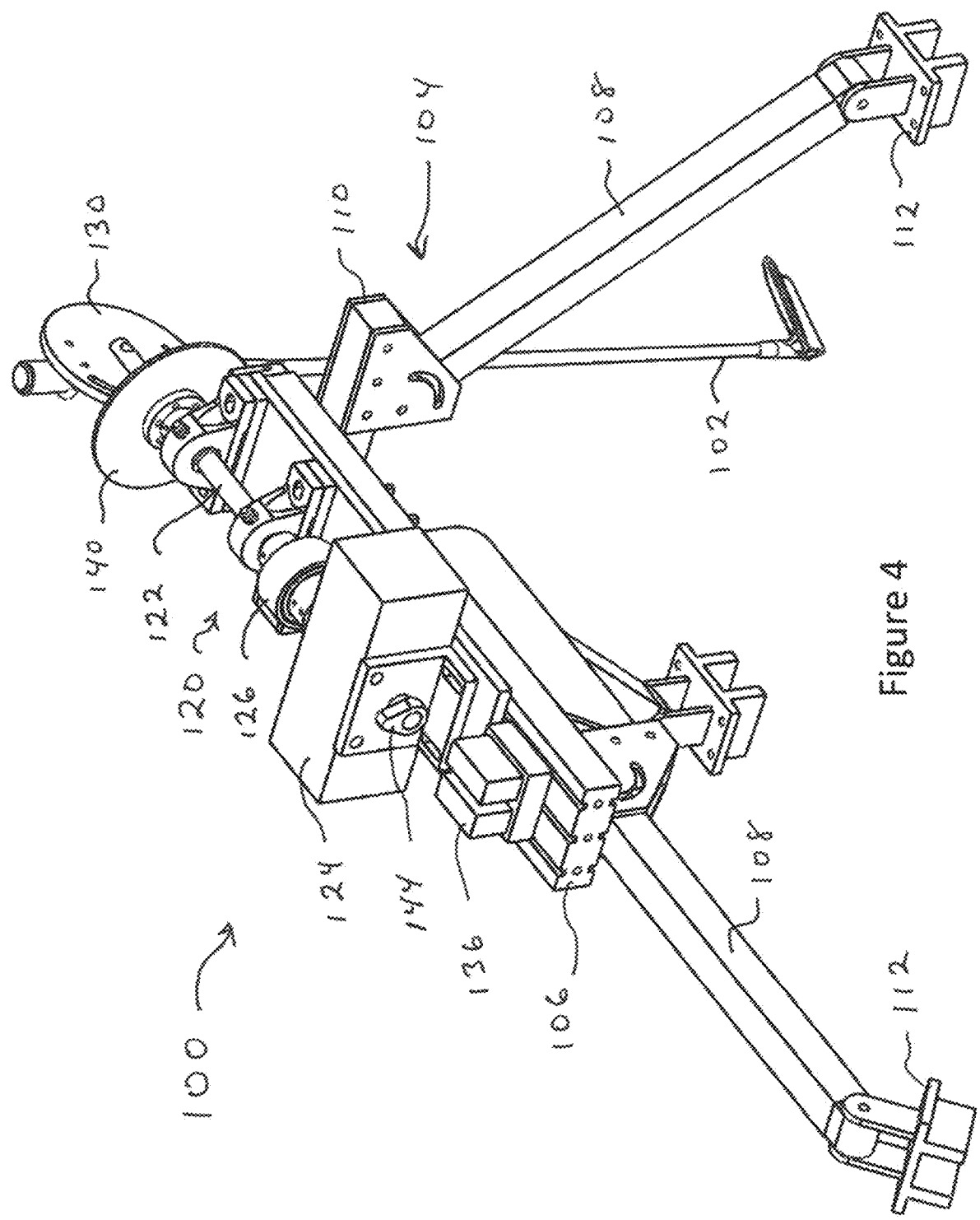
FIG. 4 is a back, right side perspective view of a robot according to the present invention.

Referring to FIGS. 2-4, the preferred portable golf hitting robot 100 is designed to hit a golf club 102 under short game conditions. Accordingly, the robot 100 is comprised of a lightweight frame 104. The frame includes a main body member 106 and a plurality of arms 108. The arms 108 are preferably coupled to the main body member 106 by pivot couplings 110. With each arm 108 independently coupled to the main body member 106, they can be independently adjusted so that the robot 100 can be used on uneven terrain, such as a fairway with undulation or even in a sand trap. At the distal ends of the arms 108 are ground abutting pads 112. Wheels can be added at the distal end of the arms 108 for increased mobility. However, pads 112 are preferred for stability when the club head contacts the ground during the hitting motion. For increased adjustability, the arms 108 can be made to telescope or arm extensions that telescope can be added to the ends of the arms.

The golf club 102 is powered by or swung in a pendulum motion by the rotary actuating system 120. The system 120 is comprised of a drive shaft 122 coupled to the frame's main body member 106, a drive unit 124 coupled to a first end of the drive shaft 122 for supplying power thereto and a golf club gripping member 130 coupled to a distal end of the drive shaft 122. The golf club 102 is attached to the golf club gripping member 130 and the drive unit 124 provides the power to swing the club. The robot 100 further comprises a one-way clutch 126 juxtaposed between the drive unit 124 and the golf club gripping member 130 such that the club head can freely swing after the drive unit 124 has stopped rotating.

In a preferred embodiment, the golf gripping member 130 is a lie adjusting plate with a plurality of clamps 132 to secure the club to the plate 130. Clamps 132 or other means to secure the club such as a collet with a self-locking taper should make sure that the club is still retained to the robot even if power is lost. The clamps 132 allow for easy adjustment of the club face from a square to open or closed position. The lie adjusting plate 130 preferably includes an arcuate shaped lie adjustment groove 134 that allows the plate to be rotated about an axis that is perpendicular to the drive shaft axis 128 such that the lie angle of the golf club can be adjusted. Identification marks on the plate 130 can be used to confirm the lie angle relative to the robot. Preferably, the drive shaft axis 128 extends through or approximate to the golf club grip and the golf club 102 is rotated in a pendulum manner about the drive shaft axis 128. Most preferably, a portion of the golf club grip is located within 4 inches of the drive shaft axis 128. In this embodiment of the invention, the weight associated with robot swing arms and wrists is eliminated and the size of the drive unit can be significantly reduced because less weight is being rotated.

The preferred drive unit 124 is a pneumatic rotary actuator such as a rack and pinion type series NRCA1 from SMC Corporation of America. Different sizes can be selected depending on the amount of force or torque desired and the angular rotation of the actuator. The applicants have found that the 180 degree actuation angle is more than sufficient. The robot further comprises pneumatic controls 136 for adjusting the amount of force applied to the golf club by the drive unit 124 and an air reservoir 138 coupled to the pneumatic actuator 124. Different hitting conditions can also affect the amount of pressure required. Also, if more club speed is required based on the amount of force available from an actuator, a swing arm, not shown, can be added to the system so that the club head speed is increased. Preferably, a pneumatic rotary actuator such as SMC's Rack & Pinion Type Series NCRA1BW80-190C is directly coupled though the drive shaft to the golf club gripping member such that the torque ratio is 1-1. Thus, when the club head impacts the ground, the reflective inertia back to the pneumatic rotary actuator is minimized. Further, a spring member can be located in the drive shaft 122 such that it absorbs reflective forces from the club head impacting the ground.

The robot can further include a disc brake 140 coupled to the drive shaft 122 and brake calipers 142 for stopping the rotation of the golf club. Preferably, a cam 144 is coupled to the drive unit 124 or drive shaft 122 for actuating the brake calipers 142 after the club head has contacted the golf ball. Preferably the cam 144 hits a pneumatic actuation trigger or an electronic trigger, not shown, and is coupled to be in a fixed angular orientation relative to the drive unit 124. Thus, when the drive unit 124 reaches the end of its rotation, preferably when the club head 102 is approximately 10 to 90 degrees past the ball impact location, the cam 144 actuates the trigger to actuate the disc brake calipers 142.

The preferable frame 104 is structurally small and lightweight. Preferably, the robot frame 104 is comprised of aluminum such that the entire robot weighs less than about 150 lbs. More preferably, the robot weighs less than about 100 lbs.

In another preferred embodiment, a spring member or shock absorber can be juxtaposed the golf club and the golf club gripping member such that the impact of the club head hitting the ground can be partially absorbed and the reflective forces on the robot reduced. For example, the gripping mechanism could allow motion of the golf club in the axial direction and the spring could limit twisting forces. Alternatively, a very stiff spring could be used to couple the golf club to the robot to allow movement in all directions.

Figure 5:
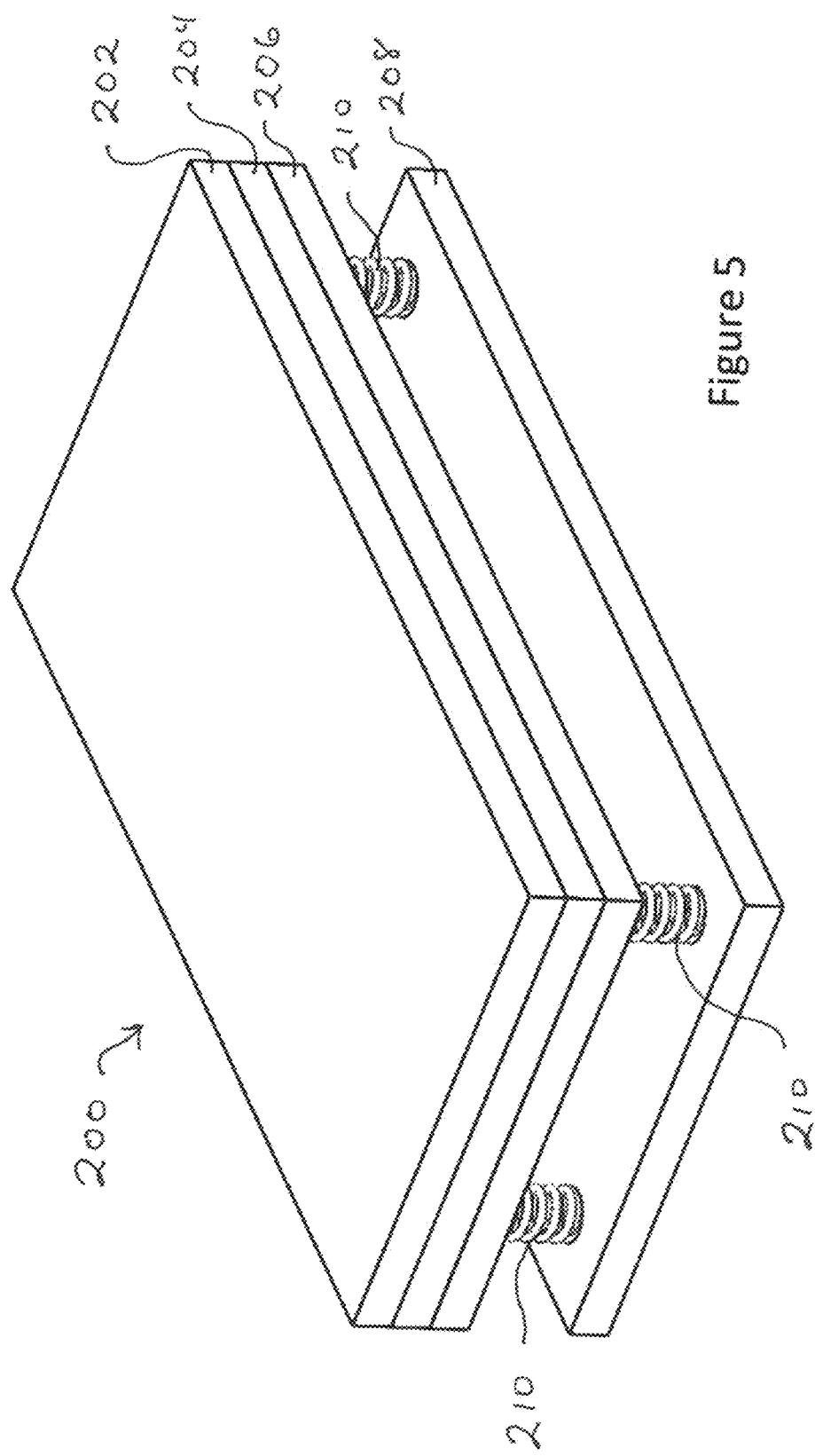
FIG. 5 is a perspective view of a hitting mat according to the present invention

The present invention also includes a ground simulating hitting mat 200. Referring to FIG. 5, the mat preferably includes a turf layer 202, a foam layer 204 coupled to a bottom surface of the turf layer 202, a first structural layer 206 coupled to a bottom surface of the foam layer 204, a base 208, and a plurality of springs 210 juxtaposed the base 208 and the first structural layer 206. The base 208 and the first structural layer 206 are stiff members and can be made from plywood or the like. The mat 200 is designed to be flexible such that when a golf ball is struck off of the mat 200, the forces from the mat on the ball simulate the forces from the ground. In this manner, multiple hits can be made off of the mat 200 without moving the robot 100 and the golf club can still impact the golf ball at a downward angle such as that used in real player shots. Preferably, either the club or the mat can include stress and strain gages to measure the impact force and torque between the mat and the club such that the force created by different sole configurations can be measured. If the club is also going to be tested in actual turf, it is better to have the force measuring device directly coupled to the club. For example, sensors can easily be coupled to the shaft of the club to measure impact force and torque so that the force of impact can be measured and compared.

The present invention is also directed to a method of simulating short shot performance with a portable robot. In order to simulate short game conditions, a golf ball. is placed on the ground or on a ground simulating mat and struck with a golf club having 48 degrees of loft or more. Preferably, the golf club is not attached to the robot through a swing arm and/or swing wrist, but rather is coupled to a club gripping member that is rotated about the axis of a drive shaft. Thus, the robot is comprised of a frame, a drive shaft coupled to the frame, a drive unit coupled to a first end of the drive shaft for supplying power thereto and a golf club gripping member coupled to a distal end of the drive shaft such that the torque ratio from the drive unit to the club gripping member is 1-1. The club is thus rotated in a pendulum manner about the drive shaft axis which extends proximate the golf club grip. By rotating the club in a circular motion about the drive shaft, the angle of impact with the ball and ground can be easily adjusted by moving the ball with respect to the vertical plane that includes the drive shaft axis. For example, if the ball is located directly in the vertical plane, the club head can impact the ball at its lowest point of the arc and have a flat impact direction. However, if the ball is moved back relative to the vertical plane and the height of the gripping member lowered, the club head can impact the ball at a steep angle of attack to pinch the ball between the club head and the ground as many players do. The robot can further be comprised of a one-way clutch juxtaposed between the drive unit and the golf club gripping member and a disc brake for stopping the rotation of the club head. Preferably, the ground element is a hitting mat that simulates the forces on the golf hall when struck so that repeated shots from the same location can be made.

The robot can also be repositioned after impact by moving the robot on wheels, tractor treads or rails. Directional wheels such as Vex Mecanum Wheels or Vex Omni Wheels are preferred for multidirectional control. A small motor can be used to adjust the position of the robot, which can be moved with a joystick or a stereo vision system or the like.

Figure 6:
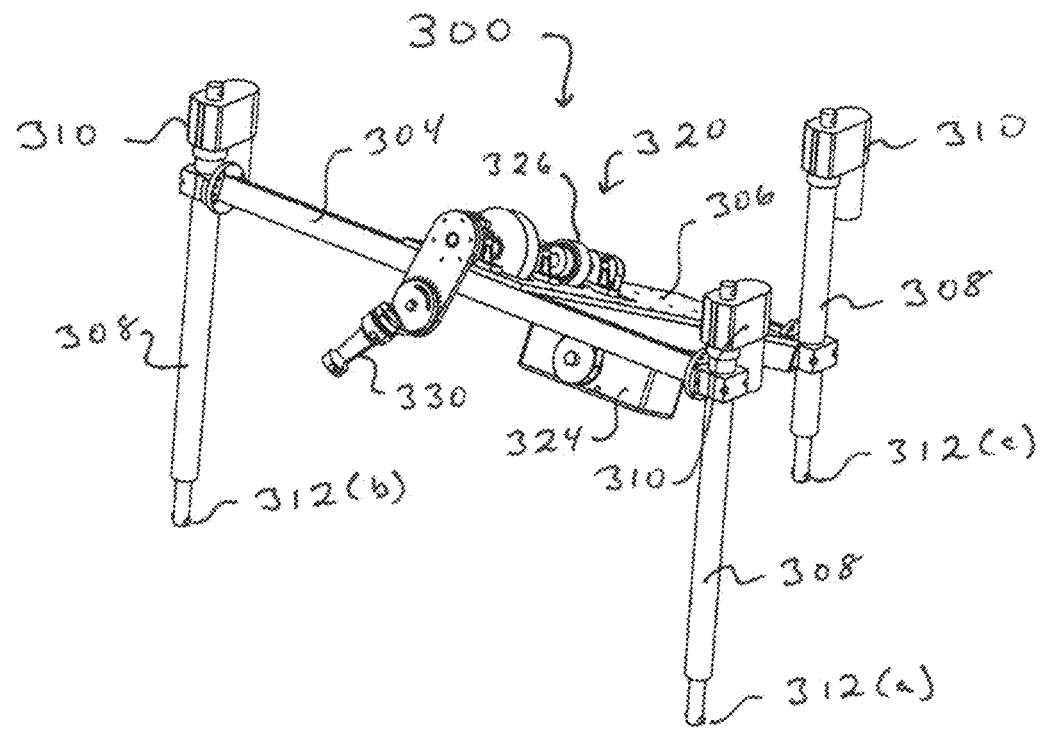
FIG. 6 is a front, right side perspective view of a robot according to the present invention.
Figure 7:
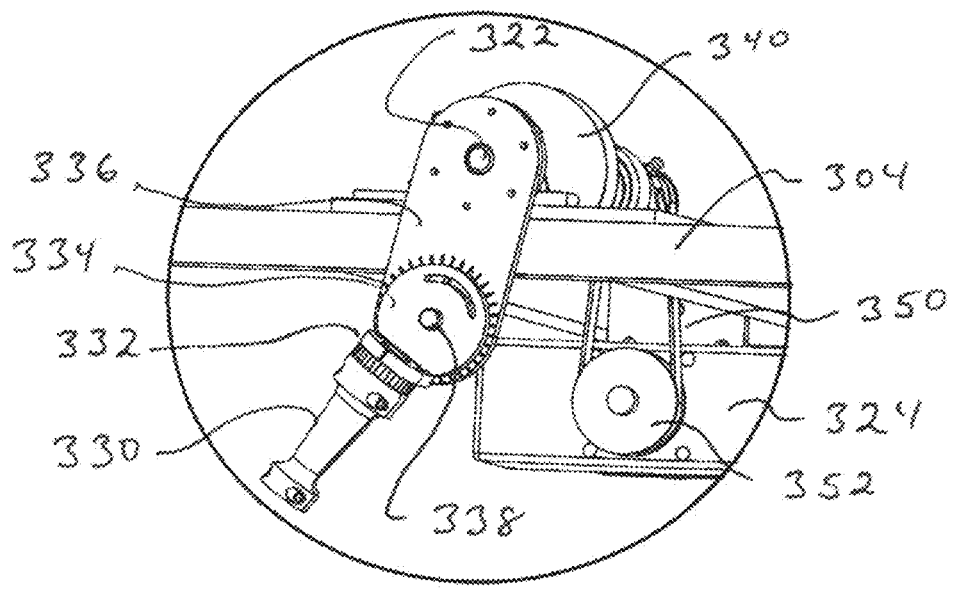
FIG. 7 is a front, right side close-up view of the robot in FIG. 6.
Figure 8:
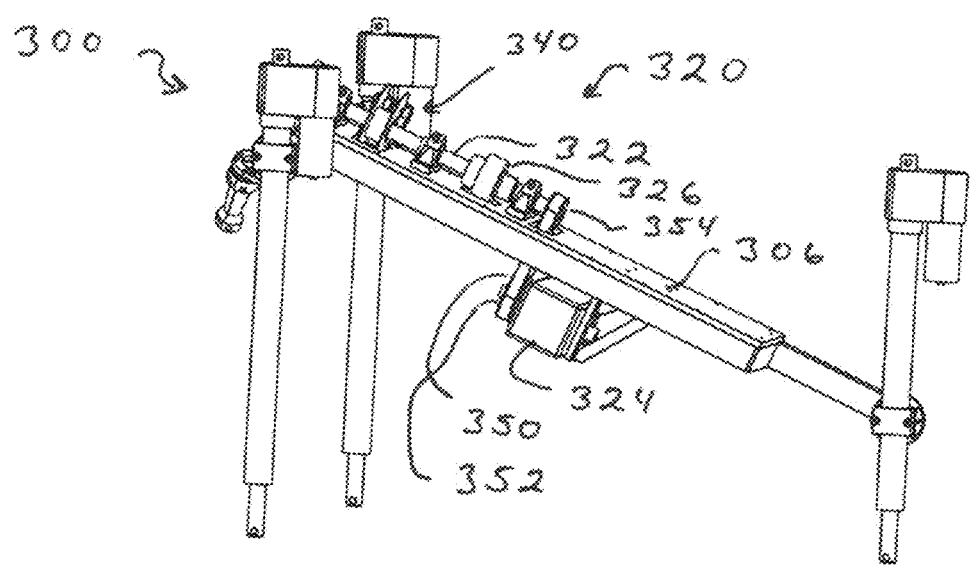
FIG. 8 is a side view of the robot according to FIG. 6.

Referring to FIGS. 6-8, another embodiment of the preferred portable golf hitting robot 300 is designed to hit a golf club under short game conditions. Accordingly, the robot 300 is comprised of a lightweight frame 304. The frame includes a main body member 306 and a plurality of arms 308. In this embodiment, the arms 308 are preferably coupled to the main body member 306 and are powered by electric motors 310. With each arm 308 independently coupled to the main body member 306, they can be independently adjusted so that the robot 300 can be used on uneven terrain, such as a fairway with undulation or even in a sand trap and can be adjusted for different shots as discussed below. At the distal ends of the arms 308 are ground abutting piston ends 312. Preferably, wheels can be added at the piston ends 312 for increased mobility. For increased adjustability, the piston ends 312 telescope within the arms 308 and have a travel distance of between about 10 to 20 inches so that they can be made to extend to any desired length independently by a remote controller. The robot 300 can be adjusted for lie angle of the club by actuating the electric motors 310 in a front-to-back manner. In other words, the front two piston ends 312(a) and 312(b) can be extended relative to the back piston end 312(c) to decrease the lie angle of the club to be hit. Conversely, the rear piston end 312(c) can be extended relative to the front piston ends 312(a) and (b) to increase the lie angle of the club. The robot 300 can also be adjusted to manipulate the club angle of decent by moving the ball relative to the front two pistons 312(a) and 312(b). For example, by moving the ball closer to the arm end 312(a) on the right side of the hitting location, the club's angle of decent can be decreased to have a flatter impact or to hit up on the ball. Conversely, by moving the ball closer to the left piston end 312(b) relative to the right piston end 312(a), the club's angle of decent can be increased such that the club hits down on the ball at a steeper angle.

Preferably, the robot includes several operating switches for the arms 312. For example, a first switch can raise and lower the front arms 312(a) and (b) simultaneously. A second and third switch can raise and lower the front arms 312(a) and (b) respectively, so that they can be independently adjusted. Finally, a fourth switch can raise and lower the back arm 312(c). Each of the switches preferably includes a fast mode and a slow mode to better operate the arms 312.

The golf club is powered by or swung in a circular motion by the rotary actuating system 320. The system 320 is comprised of a drive shaft 322 comprising a first portion 322a and a second portion 322b coupled to the frame's main body member 306, a drive unit 324 operably coupled to a first end of the first portion 322a of the drive shaft 322 for supplying power thereto and a golf club gripping member 330 operably coupled to a distal end of the second portion 322b of the drive shaft 322. The golf club is attached to the golf club gripping member 330 and the drive unit 324 provides the power to swing the club. The robot 300 further comprises a one-way clutch 326 that is operably coupled between the first portion 322a and the second portion 322b such that torque from the first portion 322a can be transferred through the one-way clutch 326 to the second portion 322b and the club head can freely swing after the drive unit 324 has stopped rotating. Preferably, the drive unit 324 rotates approximately 180 to 200 degrees and stops rotating when the club is just before or at impact with the golf ball.

In a preferred embodiment, as shown in FIG. 7, the golf gripping member assembly is comprised of a golf gripping member 330 that is operably coupled to the second portion 322b of the drive shaft 322 through a face angle adjustment rotator 332, a club loft adjustment plate 334 and an arm member 336. The face angle of the club head can be opened or closed by rotating the gripping member 330 relative to the face angle adjustment rotator 332 and then locking it in place. Moreover, the gripping member 330 is coupled to a club loft adjustment plate 334, which is rotatably attached to the arm member 336 via a locking mechanism 338. The club loft adjustment plate 334 rotates to increase or decrease the loft of the club head to simulate different shots hit by golfers.

The preferred drive unit 324 is a pneumatic rotary actuator such as a rack and pinion type series NRCA1 from SMC Corporation of America. Different sizes can be selected depending on the amount of force or torque desired and the angular rotation of the actuator. The applicants have found that the 180 degree actuation angle is more than sufficient. The robot further comprises pneumatic controls for adjusting the amount of force applied to the golf club by the pneumatic rotary actuator 324 and an air reservoir coupled to the pneumatic rotary actuator 324. Different hitting conditions can also affect the amount of pressure required. Also, if more club speed is required based on the amount of three available from an actuator, swing arm 336, can be added to the system so that the club head speed is increased. Preferably, the swing arm 336 has a fixed length or is adjustable such that the length between the drive shaft axis 322 and the center of the gripping member 330 is between about 4 to 20 inches, and more preferably, between about 8 and 18 inches. Most preferably, the length between the drive shaft axis 322 and the center of the gipping member 330 is between about 10 and 12 inches.

A pneumatic rotary actuator such as SMC's Rack & Pinion Type Series NCRA1BW100-190C, which can provide up to 1500 in*lbs of torque from 150 psi, is coupled through the drive shaft 322 and to the golf club gripping member 330 via a belt drive 350. The belt drive 350 includes a first belt pulley 352 coupled to the drive unit and a second belt drive pulley 354 that is coupled to the drive shaft 322. The first and second belt drive pulleys are sized to create a torque ratio that is between 0.5-1 to 4-1, and more preferably, about 1-1 to 2-1. Thus, sufficient speed and force can be applied to the club head, but when the club head impacts the ground, the reflective inertia back to the pneumatic rotary actuator is minimized. Further, the rubber belt 350 absorbs reflective forces from the club head impacting the ground, acting as a damper.

The robot can further include a disc brake 340 comprised of one or more discs and calipers coupled to the drive shaft 322 for stopping the rotation of the golf club. Preferably, a plurality of disc brakes 340 are used and a cam is coupled to the drive shaft 322 for actuating the brake calipers after the club head has contacted the golf ball. Preferably, the cam hits a pneumatic actuation trigger and is coupled to be in a fixed angular orientation relative to the drive shaft 322. Thus, when the drive shaft 322 reaches a preselected end of its rotation, preferably when the club head is approximately 10 to 90 degrees past the ball impact location, the cam hits the pneumatic trigger to actuate the disc brakes 340.

For operator safety, the robot can be fitted with a laser safety scanner that can disable the electronic firing mechanism if a person or object is too close to where the club will be swung. For example a laser scanner such as a Keyence SZ-01S can scan 270 degrees and a distance of 4.2 meters. Thus, if a person accidently walks into the robot area, the electronic firing mechanism can be shut off. Further, the robot's electronic firing mechanism can include a multi-button firing control. A radio remote control can include an enable button as well as the swing button to actuate the robot into swing mode. Furthermore, a master mode switch can completely disable the firing circuits when the operator is setting up the robot. The two modes for the master mode switch are preferably run and setup to provide the operator an additional safety mechanism.

While it is apparent that the illustrative embodiments of the invention disclosed herein fulfill the objectives stated above, it is appreciated that numerous modifications and other embodiments may be devised by those skilled in the art. Therefore, it will be understood that the appended claims are intended to cover all modifications and embodiments which would come within the spirit and scope of the present invention.

We claim:

1. A portable golf hitting robot, comprising:
a frame, a first portion of a rotary actuating system operatively coupled to the frame and a second portion of the rotary actuating system operatively coupled to the frame, a drive unit operatively coupled to the first portion through a belt drive for supplying torque thereto and a golf club gripping member assembly operatively coupled to the second portion such that torque from the drive unit can be transferred to the gripping member assembly, and
the robot further comprising a one-way clutch operably coupled between the first portion and the second portion such that torque can be transferred from the first portion to the second portion, wherein the torque applied from the drive unit to the golf club gripping member assembly through the rotary actuating system is at a ratio of less than 4-1.

2. The portable golf hitting robot of claim 1, wherein the golf gripping member assembly is comprised of a gripping member that is coupled to a face angle adjustment rotator such that the face angle of a golf club can be adjusted.

3. The portable golf hitting robot of claim 1, wherein the gripping member assembly is further comprised of a club loft adjustment plate that is adjustably coupled to an arm member, which is operatively coupled to the second portion such that the club loft adjustment plate can adjust the loft angle of the golf club.

4. The portable golf hitting robot of claim 1, wherein the drive unit is a pneumatic rotary actuator coupled to the belt drive through a first belt pulley and the first portion is connected to the belt drive through a second belt pulley to provide torque at a ratio of between 0.5-1 and 4-1.

5. The portable golf hitting robot of claim 4, wherein the robot further comprises pneumatic controls for adjusting the amount of force applied to the golf club by the drive unit.

6. The portable golf hitting robot of claim 1, wherein the drive unit is a pneumatic rotary actuator coupled to the belt drive through a first belt pulley and the first portion is connected to the belt drive through a second belt pulley to provide torque at a ratio of between 1-1 and 2-1.

7. The portable golf hitting robot of claim 1, wherein the robot further includes a disc brake operatively coupled to the second portion and brake calipers are operatively coupled to the disc brake.

8. The portable golf hitting robot of claim 1, wherein the frame includes a plurality of arms, each of the arms having an electric motor at a first end and a ground abutting member at a distal end that is opposite the first end.

9. The portable golf hitting robot of claim 1, wherein the frame is comprised of aluminum and the robot weighs less than about 250 lbs.

10. A portable golf hitting robot system, comprising:
a frame, a first portion of a rotary actuating system and a second portion of the rotary actuating system, a drive unit, a belt drive operatively coupled to the drive unit through a first belt pulley and operatively coupled to the first portion through a second belt pulley and a golf club gripping member assembly operatively coupled to the second portion, the first portion and the second portion being operatively connected through a one-way clutch such that torque from the first portion can be transferred to the second portion;
wherein the robot can swing a golf club attached to the gripping member assembly and impact a golf ball off of a ground element; and
wherein the ground element is a hitting mat comprised of a turf layer, a foam layer coupled to a bottom surface of the turf layer, a first structural layer coupled to a bottom surface of the foam layer, a base, and a plurality of springs juxtaposed the base and the first structural layer.

\* \* \* \* \*